United States Patent
O'Brien

[11] 3,870,367
[45] Mar. 11, 1975

[54] WHEELBARROW LIKE VEHICLE FOR TRANSPORTING BULKY MATERIAL SUCH AS LEAVES, TRASH OR THE LIKE

[76] Inventor: John A. O'Brien, 35 Longview Rd., Reading, Mass. 01867

[22] Filed: May 21, 1973

[21] Appl. No.: 362,543

[52] U.S. Cl.............. 298/1 B, 214/82, 280/47.31, 298/3
[51] Int. Cl............................................. B60p 1/64
[58] Field of Search............ 298/1 B, 2, 3; 280/47.3, 280/47.31, 47.26, 19; 296/36; 214/82

[56] References Cited
UNITED STATES PATENTS

| | | | |
|---|---|---|---|
| 1,639,266 | 8/1927 | Moeller | 280/47.3 |
| 2,573,584 | 10/1951 | Le Tourneau | 214/82 |
| 2,805,885 | 9/1957 | Elzea | 296/36 |
| 3,418,005 | 12/1968 | Allina | 280/47.26 |
| 3,756,548 | 9/1973 | Santarelli | 280/47.31 |

Primary Examiner—Robert B. Reeves
Assistant Examiner—Thomas E. Kocovsky
Attorney, Agent, or Firm—Robert L. Nathans

[57] ABSTRACT

A superstructure is provided which is detachably affixed to an ordinary wheelbarrow by means of four elongated support poles which are clamped to the sloping sides of the wheelbarrow. A basket-shaped net having sloping sides is affixed to the upper portions of the support poles and has a greater volumetric capacity at upper portions relative to lower portions thereby to convert an ordinary wheelbarrow into a vehicle having a high volume capacity for carrying bulky items such as, for example, leaves or trash. Since the support members are clamped to the sloping sides of the wheelbarrow they widely diverge so as to accommodate the basket-shaped net. The diverging pole orientation furthermore permits the vehicle to be very stably supported upon being tipped, by ground contact with the diverging forward elongated support members, such contact permitting ease of loading and unloading of the vehicle. The net may be readily turned inside out for discharging the bulky items by pulling upon a robe affixed to the net regardless of the presence of the bulky items.

4 Claims, 3 Drawing Figures

PATENTED MAR 11 1975  3,870,367

3,870,367

WHEELBARROW LIKE VEHICLE FOR TRANSPORTING BULKY MATERIAL SUCH AS LEAVES, TRASH OR THE LIKE

BACKGROUND OF THE INVENTION

The present invention relates to the field of ground vehicles for transporting bulky items.

It is desirable to provide an inexpensive superstructure kit which may be readily attached to a conventional wheelbarrow to produce a vehicle which may be utilized to easily transport large loads of bulky and often light material from place to place. For example, in the fall, great quantities of leaves are usually carried to a particular storage area and, in the case where an ordinary wheelbarrow is employed, many trips are required back and forth owing to the low volume capacity of such a wheelbarrow. Thus, it is desirable to readily and inexpensively convert an ordinary wheelbarrow into a vehicle having an extremely large capacity for sharply reducing the above-mentioned number of trips. It is also desirable to provide wheelbarrow superstructure which will support the vehicle on the ground in a very stabilized manner when the wheelbarrow is tipped forward and in a position to permit the vehicle to be readily loaded and unloaded.

The prior art is believed to be inadequate with regard to readily carrying out the above-mentioned functions. U.S. Pat. Nos. to Jerpbak 3,161,434; Pope 2,768,022; Nalder 1,544,769; Elzea 2,805,885 and Oakey 618,900 all illustrate wheelbarrow-like vehicles having superstructures for increasing the volumetric capacity. However, for reasons which will become apparent, these vehicles are not suitable for performing the above-mentioned function easily and inexpensively, in contrast with my vehicle described hereinbelow.

SUMMARY OF THE INVENTION

In accordance with a preferred embodiment of my invention, an inexpensive superstructure may be readily attached to and removed from an ordinary wheelbarrow to convert it into a vehicle for transporting large quantities of bulky material. A plurality of elongated support members are clamped to the wheelbarrow in a widely diverging fashion, thereby to support and accommodate a basket-shaped net, having a greater volumetric capacity at upper portions thereof relative to lower portions. The support members are also oriented so as to support and greatly stabilize the vehicle from the ground upon the forward tipping of the wheelbarrow so as to enable easy loading and unloading. The net is configured so that it may be readily turned inside out upon discharge of the bulky items from the vehicle and, if desired, such discharge may be effected by pulling on a rope which is attached to a lower portion of the net.

Other objects, features and advantages of the present invention will become apparent upon the perusal of the following description read in conjunction with the drawings in which.

SPECIFIC DESCRIPTION

Figure 1:
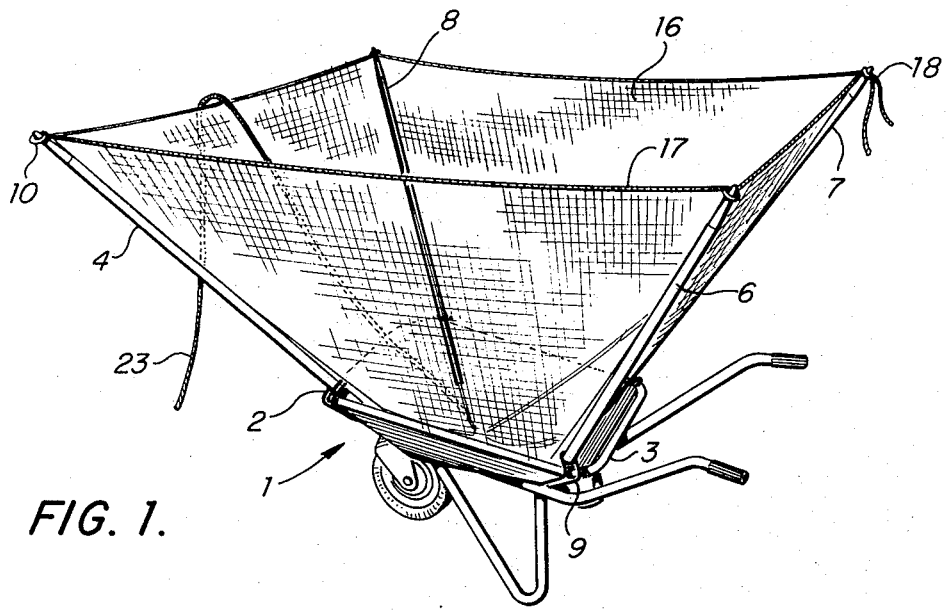
FIG. 1 illustrates the vehicle in the upright position.
Figure 3:
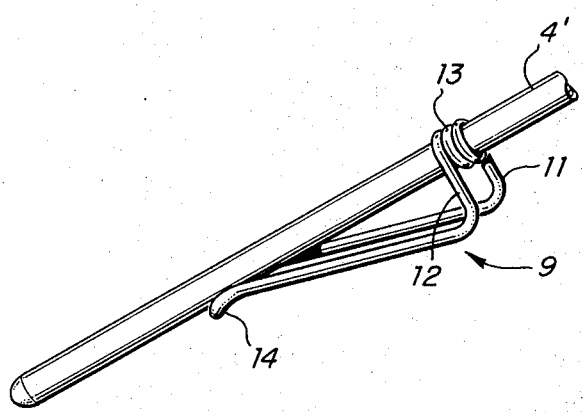
FIG. 3 illustrates a preferred form of clamping device which may be utilized for affixing the elongated support members to the wheelbarrow.

In FIG. 1, an ordinary wheelbarrow 1 having sloping sides such as 2 and 3 is illustrated. Four elongated support members, stakes or poles 4, 6, 7 and 8 are clamped to the sloping sides of the wheelbarrow as shown, so that the longitudinal axis of the poles are parallel to the inside sloping surfaces of the wheelbarrow. In other words, the clamps cause the lower portions of the poles to be positioned flush against such inside surfaces. One type of coupling or clamping device is illustrated in detail in FIG. 3, wherein an elongated spring clamping device 9 grips the lower portion 4' of pole 4. I actually constructed clamp 9 by wrapping a wire about a pole, not shown, having a somewhat smaller diameter than the lower portion of pole 4'. By separating portions 11 and 12, the inside diameter of coil 13 was increased so as to enable clamping device 9 to be slipped over pole 4 and adjustably positioned at the lower portion thereof as illustrated. Upon releasing portions 11 and 12 the coil 13 gripped the pole. Obviously an additional fastening device such as a staple may be utilized to ensure the maintenance of the position of elongated spring member 9. If desired, terminal portions, such as 14 of spring member 9, are bent as shown so that the spring member may readily clear the lip of the wheelbarrow upon clamping of the poles to the wheelbarrow base support of the vehicle. Spring member 9 will maintain the lower portions of the poles flush and parallel with respect to the sloping sides of the wheelbarrow as illustrated.

Figure 2:
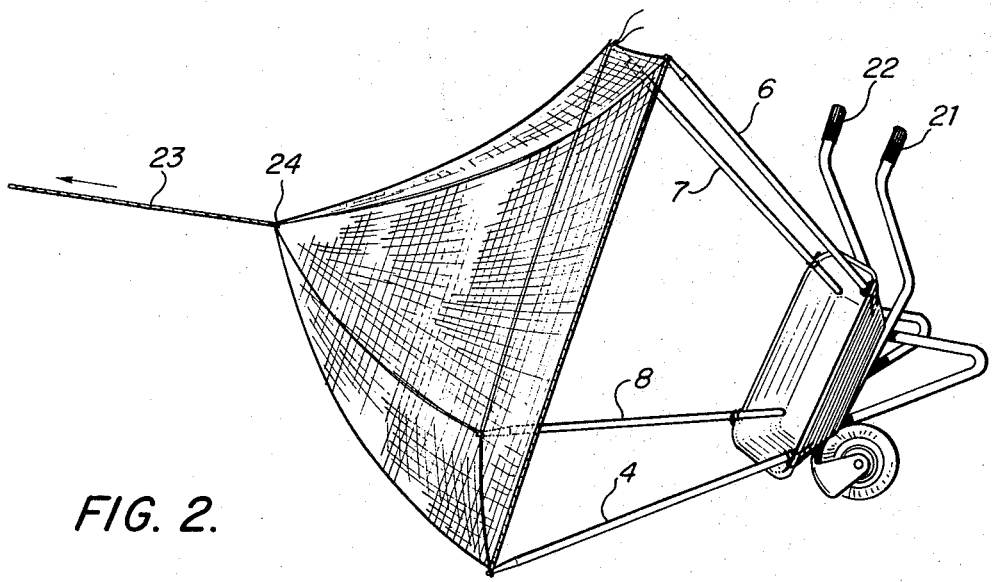
FIG. 2 illustrates the vehicle in the unloading position.

After the positioning of the poles as shown, non-rigid retaining means, which is preferably a pyramid-shaped net 16, is affixed to upper portions of the poles. This may be accomplished in a number of ways. For example, if the upper ends of the poles are tapered as shown in FIG. 2, a grommet 10 at each corner of the hem 17 of the net may be slipped over the tips. Since the grommet is too small to accommodate the full pole, it will not fall down the pole, and when the net hem is made taut, the slope of the poles is such as to force the grommet down more firmly on the taper. The upper periphery of the net is of such a length that the placing of the last grommet on its pole requires the poles to be drawn inwardly, thus inducing tension in the net hem 17 which in turn puts a strain on the pole clamps. As a result, a rigid superstructure is provided. The hem of the net may be strengthened by the use of a rope or other material. Alternatively, the hem of the net may be formed by rolling, folding, or otherwise gathering the edge of the net material itself. In any case, the openings of the net mesh may be used in lieu of grommets.

Adjustment of the tension may be made by raising or lowering the poles with respect to the clamps, thus tightening or loosening the net respectively, or by simply twisting a small rod or stick in the net mesh near the hem as with a tourniquet. A rope may be employed and would be pulled tight and knotted at 18, or clamped if desired, to induce tension in the rope, which tension tends to tip the poles inwardly with respect to the vehicle. As before, such tendency is counterbalanced by the elongated spring member coupling means, and as a result, a strong, rigid superstructure is provided. In the vehicle I have actually constructed, grommets were employed which were slipped over the tips of the poles and affixed to the net by stapling. Obviously other numerous methods may be employed for affixing the net to the upper pole portions. It is conceivable that a rope or hem may not be necessary in the case of a net or other retaining means constructed of an elastic, rubber or plastic material.

Bulky and/or generally light items such as leaves, trash, etc. are readily loaded into the vehicle, preferably by tipping it as illustrated in FIG. 2, so that forward poles 4 and 8 contact the ground to support the vehicle. It is important to note that the poles are oriented in a widely diverging fashion in order to provide for very stable ground support, and additionally in order to accommodate the pyramid-shaped net which has a higher volumetric capacity at upper portions thereof relative to lower portions. This latter feature enables unusually large quantities of material to be transported in a relatively balanced fashion. Obviously, the net may assume other basket-like forms such as cones, etc. depending upon the placement and configuration of the support members. Any shape may be utilized, the greatly preferred shape having a greater volumetric capacity at upper portions relative to lower portions.

The vehicle is tipped forward as mentioned hereinabove, and leaves may be readily raked into the net. The wheelbarrow thereafter assumes the position shown in FIG. 1 by virtue of the user pushing downward upon handles 21 and 22 and the load is thereafter transported to the discharge area wherein the wheelbarrow is again tipped forward. An elongated pulling member such as rope 23 is preferably affixed to the lower portion of the net at point 24, illustrated in FIG. 2. The user pulls upon rope 23, and the net is easily turned inside out to discharge the leaves. It is possible that the pulling rope may be eliminated and the user may manually grab the lower portion of the net to turn it inside out. However, the use of the pulling rope eases this operation since the leaves tend to obstruct access to the lower portion of the net.

In summary, I have produced a vehicle through the addition of a rigid, inexpensive superstructure which may readily be clamped and removed from an ordinary wheelbarrow, which is typically utilized for other functions throughout the year. A non-rigid retaining means such as a net is affixed to the elongated poles forming part of the superstructure and is configured to be turned inside out for ease of unloading, such net also being configured to provide a large volumetric capacity. Numerous clamping devices may be employed together with numerous types of retaining means other than nets, although nets are at present greatly preferred. For example, loose, stretchable diaphragms, bags, or other retaining means may be utilized to carry out the above functions. While it is believed that the vehicle as described above may be most economically constructed by the use of a separate kit for use with an ordinary wheelbarrow, for other purposes a unitary special purpose vehicle may employ a superstructure which is not readily detachable.

While several embodiments have been described, the teachings of this invention will suggest many other embodiments to those skilled in the art falling within the scope of the following claims:

I claim:

1. A vehicle particularly well adapted for transporting bulky items comprising:
   a. a wheelbarrow having sloping side walls;
   b. a superstructure positioned above said wheelbarrow and including a plurality of widely diverging elongated support members wherein lower portions of said elongated support members are affixed to the sloping walls of said wheelbarrow so that the longitudinal axis of said elongated support members are substantially parallel with said walls to thereby provide for the widely diverging orientation of said elongated support members;
   c. a net capable of being turned inside out, coupled to said superstructure, said net having a greater volumetric capacity at upper portions thereof relative to lower portions; and
   d. an elongated pulling member coupled to said net for enabling said net to be readily turned inside out by pulling on said pulling member in spite of the presence of said bulky items therein.

2. A vehicle particularly well adapted for transporting bulky items comprising:
   a. a wheelbarrow having sloping wall portions;
   b. a plurality of elongated support members;
   c. coupling means for coupling each elongated support member to said sloping wall portions in the neighborhood of the intersections of the planes of said wall portions and for orienting the longitudinal axis of said elongated support members parallel with said sloping wall portions so that said wheelbarrow may be tipped and be supported from the ground by virtue of contact of said elongated support members with the ground;
   d. a net coupled to upper portions of said widely diverging elongated support members for retaining said bulky items, said net having sloping sides providing for greater volumetric retention capacity at upper portions thereof relative to lower portions thereof and said net being constructed for enabling said net to be turned inside out thereby to facilitate unloading of said vehicle; and
   e. an elongated pulling member coupled to a lower portion of said net for enabling said net to be readily turned inside out by pulling on said pulling member regardless of the presence of said bulky items within said net.

3. A kit for converting a wheelbarrow having a base support to a vehicle particularly well adapted for transporting bulky items comprising:
   a. at least four elongated support members;
   b. a plurality of coupling means for coupling the base support of said wheelbarrow to lower portions of each of said elongated support members;
   c. non-rigid retaining means having widely diverging side portions and capable of being fastened to the upper portions of said elongated support means, said non-rigid retaining means being constructed to permit said retaining means to be turned inside out to provide for unloading of said bulky items from said vehicle, said retaining means having an elongated pulling rope affixed to the lower portion thereof, said pulling rope having a length enabling it to extend over the top portion of said retaining means, and
   d. tensioning means for affixing upper portions of said non-rigid retaining means to the upper portions of each of said elongated support members so that upon the tightening of said tensioning means the lower extremities of said elongated support members press against the base support of said wheelbarrow, thereby to result in a rigid superstructure including said four elongated support members, said retaining means and said tensioning means.

4. The kit of claim 3 wherein said retaining means comprise a pyramid shaped net.

* * * * *